(12) United States Patent
Fattal et al.

(10) Patent No.: US 9,568,672 B2
(45) Date of Patent: Feb. 14, 2017

(54) OPTICAL COUPLING SYSTEM AND METHOD FOR FABRICATING THE SAME

(75) Inventors: David A. Fattal, Mountain View, CA (US); Zhen Peng, Foster City, CA (US); Marco Fiorentino, Mountain View, CA (US); Raymond G. Beausoleil, Redmond, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/416,124

(22) PCT Filed: Jul. 30, 2012

(86) PCT No.: PCT/US2012/048814
§ 371 (c)(1),
(2), (4) Date: Jan. 21, 2015

(87) PCT Pub. No.: WO2014/021815
PCT Pub. Date: Feb. 6, 2014

(65) Prior Publication Data
US 2015/0316718 A1    Nov. 5, 2015

(51) Int. Cl.
*G02B 6/12*    (2006.01)
*G02B 6/42*    (2006.01)
(Continued)

(52) U.S. Cl.
CPC .................. *G02B 6/12* (2013.01); *G02B 6/124* (2013.01); *G02B 6/136* (2013.01); *G02B 6/30* (2013.01);
(Continued)

(58) Field of Classification Search
CPC ........... G02B 6/12; G02B 6/124; G02B 6/126; G02B 6/29316; G02B 6/29323; G02B 6/23925; G02B 6/30; G02B 6/305; G02B 6/34; G02B 6/42; G02B 2006/12061; G02B 2006/12107; G02B 2006/12147; G02B 2006/12176
See application file for complete search history.

(56) References Cited

U.S. PATENT DOCUMENTS 5,625,729 A * 4/1997 Brown ...................... G02B 6/34
                                                                    359/573
7,162,124 B1 * 1/2007 Gunn, III ................. G02B 6/30
                                                                    385/27
(Continued)

FOREIGN PATENT DOCUMENTS

CN         102478686 A      5/2012
KR      1020110082425 A      7/2011

OTHER PUBLICATIONS

PCT International Search Report and Written Opinion, Mar. 29, 2013, PCT Patent Application No. PCT/US2012/048814, 10 pages.

(Continued)

*Primary Examiner* — John M Bedtelyon
(74) *Attorney, Agent, or Firm* — Tarolli, Sundheim, Covell & Tummino L.L.P.

(57) ABSTRACT

An optical coupling system and method of fabrication are included. The optical coupling system includes a substrate layer and an optical waveguide material overlying the substrate layer. The optical waveguide material can include a grating. The system also includes a cover material overlying the optical waveguide material to couple an optical signal to the optical waveguide material via the grating at a coupling angle. Approximately zero energy of the coupled optical signal is lost in the substrate layer due to a combination of the coupling angle and a difference in refractive indices between the cover material and the substrate layer.

13 Claims, 7 Drawing Sheets

(51) Int. Cl.
*G02B 6/34* (2006.01)
*G02B 6/136* (2006.01)
*G02B 6/30* (2006.01)
*G02B 6/124* (2006.01)

(52) U.S. Cl.
CPC . *G02B 6/34* (2013.01); *G02B 6/42* (2013.01); *G02B 2006/12176* (2013.01)

(56) References Cited

U.S. PATENT DOCUMENTS

| | | | |
|---|---|---|---|
| 7,184,627 | B1 | 2/2007 | Gunn, III et al. |
| 7,885,498 | B2* | 2/2011 | Kennedy .............. G02B 6/0028 250/227.2 |
| 7,928,386 | B2* | 4/2011 | Frey ....................... B82Y 20/00 250/336.2 |
| 8,639,073 | B2* | 1/2014 | Pelletier .................. G02B 6/30 385/37 |
| 2003/0108274 | A1 | 6/2003 | Haronian |
| 2009/0290837 | A1 | 11/2009 | Chen et al. |
| 2010/0202738 | A1 | 8/2010 | Kopp |
| 2010/0209048 | A1 | 8/2010 | Kennedy et al. |
| 2010/0278480 | A1 | 11/2010 | Vasylyev |
| 2010/0329603 | A1 | 12/2010 | Kopp |
| 2012/0045172 | A1 | 2/2012 | Feng et al. |

OTHER PUBLICATIONS

Taillaert, D. et al., An Out-of-plane Grating Coupler for Efficient Butt-coupling Between Compact Planar Waveguides and Single-mode Fibers, (Research Paper), IEEE Journal of Quantum Electronics, Jul. 2002, pp. 949-955, vol. 38, No. 7.

Taillaert, D. et al.,Grating Couplers for Coupling Between Optical Fibers and Nanophotonic Waveguides, (Research Paper), Japanese Journal of Applied Physics, Aug. 4, 2006, pp. 6071-6077, vol. 45, No. 8A.

Total Internal Reflection, Wikipedia, Retrieved from the Internet: <https://en.wikipedia.org/wiki/Total_internal_reflection> [retrieved on Oct. 29, 2015], 6 pages.

Celler, G.K., "Frontiers Of Silicon-On-Insulator," Journal of Applied Physics, 93.9, 2003, pp. 4955-4978, http://scitation.aip.org/content/aip/journal/jap/93/9/10.1063/1.1558223.

Extended European Search Report received in EP Application No. 12882153.5, Feb. 2, 2016, 12 pages.

Kopp, C. "Fiber Grating Couplers For Silicon Nanophotonic Circuits: Design Modeling Methodology and Fabrication Tolerances," Optics Communications 282.21, 2009, pp. 4242-4248, http://www.sciencedirect.com/science/article/pii/S0030401809007366.

* cited by examiner

OPTICAL COUPLING SYSTEM AND METHOD FOR FABRICATING THE SAME

BACKGROUND

Optical signal transfer is becoming more prevalent in computer systems and network communications. Optical signals can propagate in a variety of different media, such as optical fibers and optical waveguides, between different computer systems and network devices. Optical signals that propagate between different propagation media may pass through an optical coupling system. As an example, an optical coupling system can couple an optical fiber with an optical waveguide, such as via a grating. Therefore, the optical signal can propagate between the optical fiber and the optical waveguide. Such optical coupling can result in a loss of optical energy of the optical signal.

DETAILED DESCRIPTION

Figure 1:
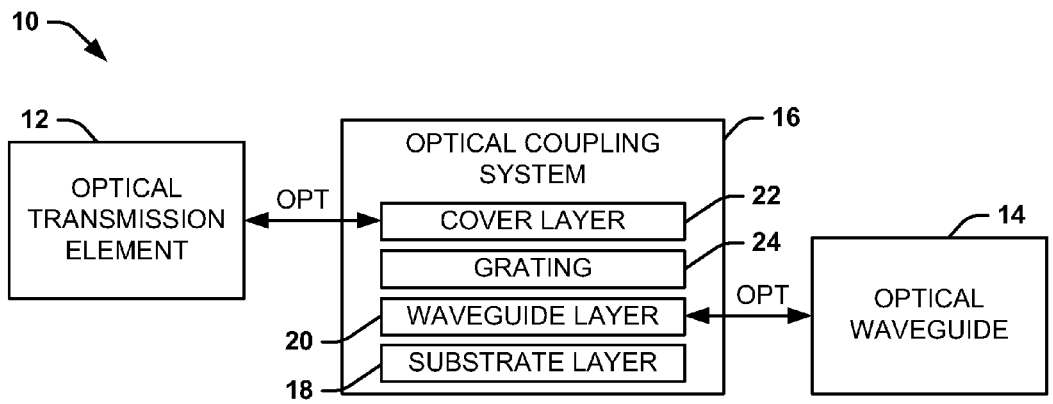
FIG. 1 illustrates an example of an optical system.

FIG. 1 illustrates an example of an optical system 10. The optical system 10 can be implemented in any of a variety of computer and/or network systems, such as optical computing and communications. The optical system 10 is configured to couple an optical signal OPT between an optical transmission element 12 and an optical waveguide 14. As an example, the optical transmission element 12 can be configured as a single mode optical fiber or as a laser (e.g., a vertical cavity surface-emitted laser (VCSEL)). As another example, the optical waveguide 14 can be configured as a photonic wire. The optical signal OPT can be provided from the optical transmission element 12 to the optical waveguide 14, or can be provided from the optical waveguide 14 to the optical transmission element 12. Thus, the optical signal OPT can continue to propagate along the optical waveguide 14 or the optical transmission element 12.

The optical system 10 includes an optical coupling system 16 configured to provide a transition of the optical signal OPT between the optical transmission element 12 and the optical waveguide 14. In the example of FIG. 1, the optical coupling system 16 can include a substrate layer 18, an optical waveguide layer 20 that is coupled to the optical waveguide 14, and a cover layer 22 that can be coupled to the optical transmission element 12. The optical coupling system 16 also includes a grating 24, such as can be etched onto the optical waveguide layer 20 of the optical coupling system 16. The optical signal OPT can thus be provided to the optical waveguide layer 20 of the optical coupling system 16 from the cover layer 22 of the optical coupling system 16 via the grating 24, such that the optical signal OPT is coupled from the optical transmission element 12 to the optical waveguide 14. Similarly, the optical signal OPT can be provided to the cover layer 22 of the optical coupling system 16 from the optical waveguide layer 20 of the optical coupling system 16 via the grating 24, such that the optical signal OPT is coupled from the optical waveguide 14 to the optical transmission element 12.

As an example, the substrate layer 18 can include a material having a first refractive index $n_1$, the cover layer 22 can include a material have a second refractive index $n_2$ that is greater than the first refractive index $n_1$, and the optical waveguide layer 20 can include a material having a third refractive index $n_3$ that is greater than the second refractive index $n_2$. In addition, the optical transmission element 12 can be coupled with the cover layer 22 at a coupling angle $\theta_1$ that is greater than a total internal reflection (TIR) angle $\theta_2$ associated with the cover layer 22 and the substrate layer 18. As an example, the TIR angle $\theta_2$ can be defined as follows:

$$\sin \theta_2 = n_1/n_2 \quad \text{Equation 1}$$

Accordingly, the coupling angle $\theta_1$ can be defined as follows:

$$\theta_1 > \arctan(n_1/n_2) \quad \text{Equation 2}$$

As an example, the coupling angle $\theta_1$ can correspond to an angle at which the optical transmission element 12 provides or receives the optical signal OPT to or from the cover layer 22 relative to a normal vector associated with a surface of the cover layer 22. For example, the coupling angle $\theta_1$ can be an angle at which the optical transmission element 12 configured as a laser or a single mode optical fiber emits the optical signal OPT onto the cover layer 22. As another example, the optical coupling system 16 can include a recess etched into the cover layer 22, such as to receive or emit the optical signal OPT via free space. As yet another example, the recess can be configured to receive the optical transmission element 12 configured as a single mode optical fiber, such that the single mode optical fiber is spliced into the recess.

Based on the magnitude of the refractive index $n_1$ relative to the refractive index $n_2$, and based on the coupling angle $\theta_1$ being greater than the TIR angle $\theta_2$, optical losses of the optical signal OPT into the substrate layer 18 can be substantially mitigated in the coupling of the optical signal OPT between the optical transmission element 12 and the optical waveguide 14. Therefore, based on the relative refractive indices $n_1$ and $n_2$ of the substrate layer 18 and the cover layer 22, respectively, as well as the coupling angle $\theta_1$ at which the optical signal OPT is incident upon the grating 24, the optical coupling system 16 can be substantially lossless when coupling the optical signal OPT between the optical transmission element 12 and the optical waveguide 14.

Figure 2:
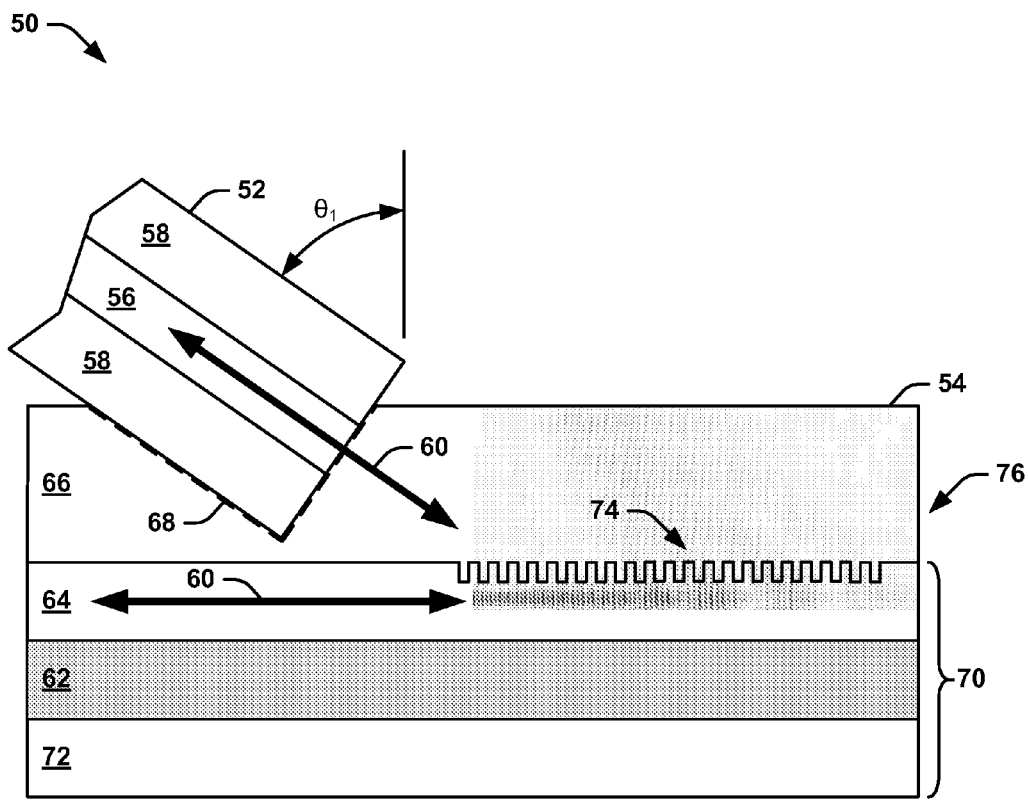
FIG. 2 illustrates an example of a diagram demonstrating optical coupling.

FIG. 2 illustrates an example of a diagram 50 demonstrating optical coupling. The diagram 50 includes a single mode optical fiber 52 and an optical coupling system 54. The single mode optical fiber 52 and the optical coupling system 54 can correspond to the optical transmission element 12 and the optical coupling system 16, respectively, in the example of FIG. 1. Therefore, reference is to be made to the example of FIG. 1 in the following description of the example of FIG. 2.

In the example of FIG. 2, the single mode optical fiber 52 comprises a single mode core 56 and a cladding 58. The single mode core 56 is configured to propagate an optical signal 60, such as the optical signal OPT in the example of FIG. 1. In addition, the optical coupling system 54 includes a substrate layer 62, an optical waveguide layer 64, and a cover layer 66. The optical waveguide layer 64 can be coupled to an optical waveguide (not shown), such as the optical waveguide 14 in the example of FIG. 1. As demonstrated in the example of FIG. 2, a recess 68 has been etched into the cover layer 66 to receive the single mode optical fiber 52, such that the single mode optical fiber 52 is directly coupled with the cover layer 66. In addition, in the example of FIG. 2, the substrate layer 62 and the optical waveguide layer 64 can be formed from a silicon-on-insulator (SOI) structure 70. The SOI structure 70 includes a first silicon layer 72, an insulator layer that corresponds to the substrate layer 62, and a second silicon layer that corresponds to the optical waveguide layer 64.

The optical coupling system 54 further includes a grating 74, demonstrated in the example of FIG. 2 as having been etched onto the optical waveguide layer 64. The optical signal 60 can thus be provided to the optical waveguide layer 64 of the optical coupling system 54 from the cover layer 66 via the grating 74, such that the optical signal 60 is coupled from the single mode optical fiber 52 to the corresponding optical waveguide. Similarly, the optical signal 60 can be provided to the cover layer 66 from the optical waveguide layer 64 via the grating 74, such that the optical signal 60 is coupled from the associated optical waveguide to the single mode optical fiber 52.

As an example, the substrate layer 62 can be formed from a material having a first refractive index $n_1$, the cover layer 66 can be formed from a material have a second refractive index $n_2$ that is greater than the first refractive index $n_1$, and the optical waveguide layer 20 can be formed from a material having a third refractive index $n_3$ that is greater than the second refractive index $n_2$. As an example, the substrate layer 62 can be formed from glass (e.g., silicon dioxide ($SiO_2$)), the cover layer 66 can be formed from silicon nitride (SiN), and the optical waveguide layer can be formed from silicon (Si). In addition, in the example of FIG. 2, the single mode optical fiber 52 is demonstrated as coupled with the cover layer 66 at a coupling angle $\theta_1$. As an example, the coupling angle $\theta_1$ can be greater than a TIR angle $\theta_2$ associated with the cover layer 66 and the substrate layer 62, such as demonstrated previously by Equation 2. As a result, the optical signal 60 can be coupled between the optical waveguide layer 64 and the single mode optical fiber 52 such that optical losses to the substrate layer 62 are substantially mitigated.

For example, as demonstrated in the example of FIG. 2, the optical signal 60 can be coupled from the single mode optical fiber 52 to the cover layer 66 and into the optical waveguide layer 64 via the grating 74, such as after at least a portion of the optical signal 60 is reflected from an edge 76 of the optical coupling system 54. Similarly, the optical signal 60 can be coupled from the optical waveguide layer 64 to the cover layer 66 and into the single mode optical fiber 52 via the grating 74. Because the refractive index $n_2$ of the cover layer 66 is greater than the refractive index $n_1$ of the substrate layer 62, and because the coupling angle $\theta_1$ is greater than the TIR angle $\theta_2$ associated with the cover layer 66 and the substrate layer 62, substantially none of the optical signal 60 is coupled into the substrate layer 62. Accordingly, the coupling of the optical signal 60 between the single mode optical fiber 52 and the associated optical waveguide coupled to the optical waveguide layer 64 can be substantially lossless.

Fabrication of the optical coupling system 54 will now be described. In the following description of the examples of FIGS. 3-12, reference is to be made to and like reference numbers are used as in the example of FIG. 2.

Figure 3:
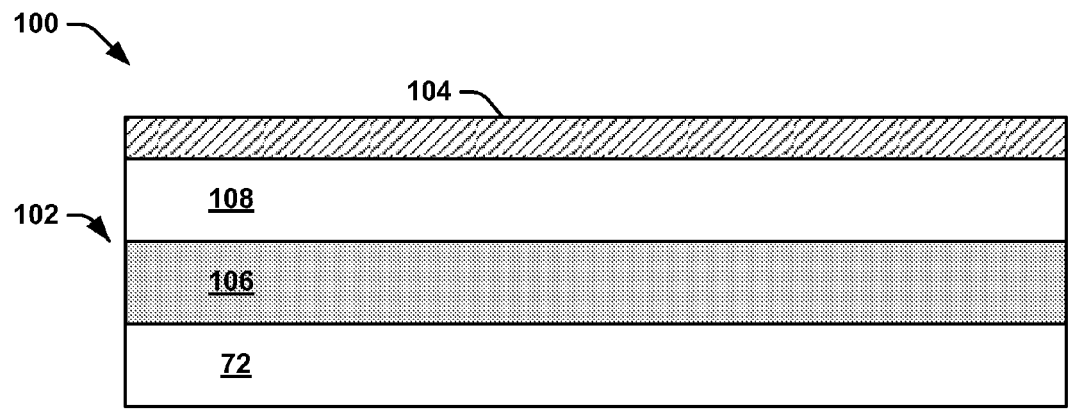
FIG. 3 illustrates an example diagram of a cross-sectional view of a silicon-on-insulator (SOI) structure including a photoresist layer.

FIG. 3 illustrates an example of a cross-sectional view diagram 100 of an SOI structure 102 including a photoresist layer 104. The SOI structure 102 is demonstrated in the example of FIG. 3 as a portion of an SOI wafer that includes the first silicon layer 72, an insulator layer 106 that corresponds to the substrate layer 62, and a second silicon layer 108 that corresponds to the optical waveguide layer 64. As an example, the SOI structure 102 can be formed via a Separation by Implantation of Oxygen (SIMOX) process. The basic steps of the SIMOX process can include implanting oxygen beneath the surface of a silicon wafer. A high temperature annealing step can next be performed to coalesce the implanted oxygen atoms into a uniform layer of $SiO_2$. The annealing step can typically be performed at temperatures greater than 1250° C. for several hours to coalesce the implanted oxygen and achieve solid state recrystallization of the second silicon layer 80 from the surface downward. Thus, as an example, the second silicon layer 80 can be grown to have a thickness of approximately 500 μm.

The SOI structure 102 is also illustrated as including the photoresist layer 104 formed on the second silicon layer 108. The photoresist layer 104 can have a thickness of about 500 Å-5000 Å. However, it is to be appreciated that the thickness thereof may be of any dimension suitable for fabricating the optical coupling system 54. Accordingly, the thickness of the photoresist layer 104 can vary in correspondence with the wavelength of radiation used to pattern the photoresist layer 104. The photoresist layer 104 may be formed overlying the second silicon layer 108 via conventional spin-coating or spin casting deposition techniques.

Figure 4:
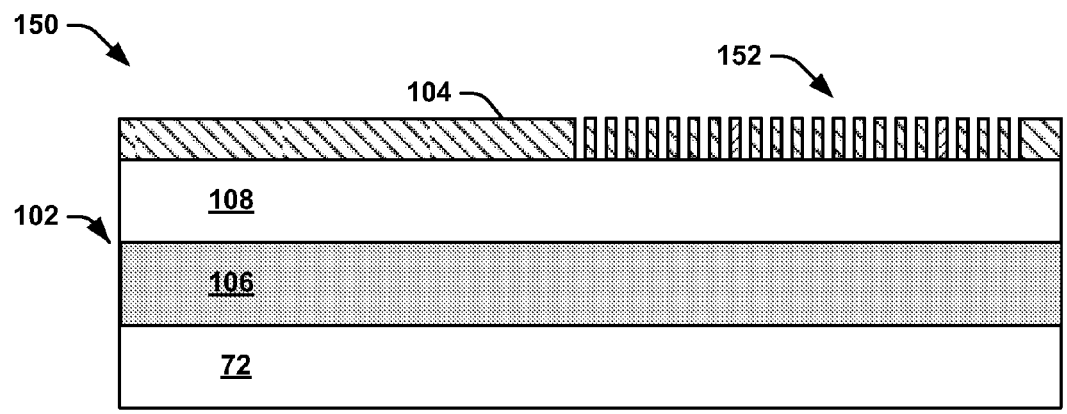
FIG. 4 illustrates an example diagram of the SOI structure of FIG. 3 with the photoresist layer having been patterned.

FIG. 4 illustrates an example diagram 150 of the SOI structure 102 of FIG. 3 with the photoresist layer 104 having been patterned. Specifically, the photoresist layer 104 is patterned to form a patterned photoresist layer 152 using conventional techniques to form ridges that correspond to the grating 74. The patterned photoresist layer 152 can thus serve as an etch mask layer for processing or etching the underlying second silicon layer 108.

Figure 5:
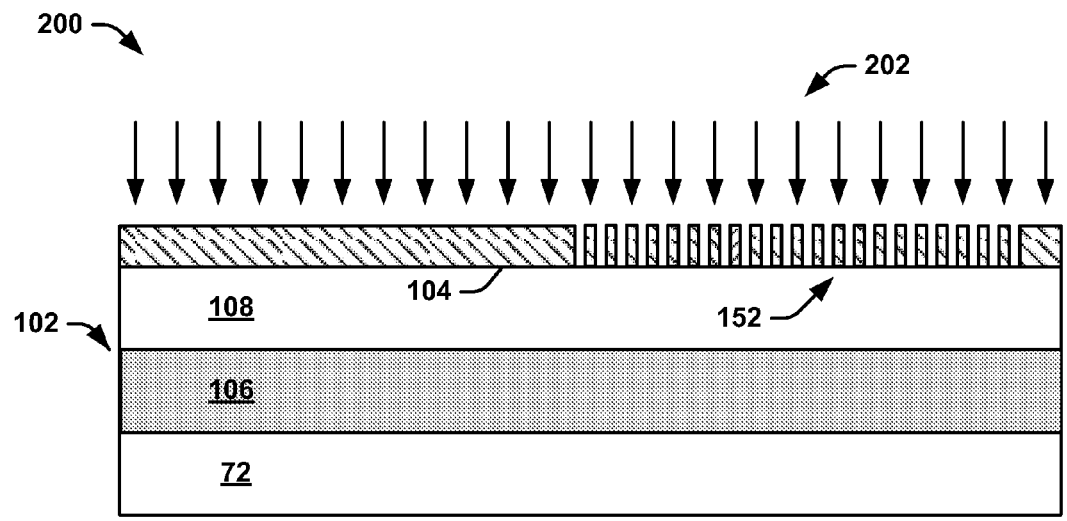
FIG. 5 illustrates an example diagram of the SOI structure of FIG. 4 undergoing an etching step.

FIG. 5 illustrates an example diagram 200 of the SOI structure 102 of FIG. 4 undergoing an etching step. The etch can be an anisotropic deep reactive ion etching (DRIE), as indicated by the arrows 202. Any suitable DRIE etch technique may be used to etch the second silicon layer 108. For example, the second silicon layer 108 can be anisotropically etched with one or more plasma gases, such as carbon tetrafluoride ($CF_4$) containing fluorine ions, in a commercially available etcher, such as a parallel plate DRIE apparatus or, alternatively, an electron cyclotron resonance (ECR) plasma reactor to replicate the mask pattern of the patterned photoresist layer 152.

Figure 6:
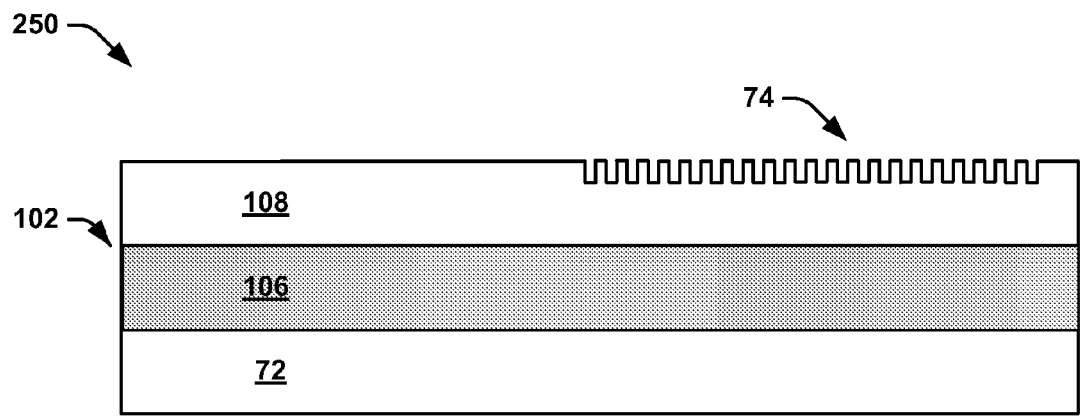
FIG. 6 illustrates an example diagram of the SOI structure of FIG. 5 after the etching step is substantially complete.

FIG. 6 illustrates an example diagram 250 of the SOI structure 102 of FIG. 5 after the etching step is substantially complete. Specifically, the diagram 250 illustrates a partially complete SOI structure 102 after a stripping step (e.g., ashing in an $O_2$ plasma) is substantially complete to remove remaining portions of the photoresist layer 104 and the patterned photoresist layer 152. Therefore, the SOI structure 102 includes the grating 74 that has been etched via the DRIE etch process of the example of FIG. 5 in the second silicon layer 108. The DRIE etch process is thus demonstrated in the example of FIG. 6 as having etched the grating 74 into the second silicon layer 108, and thus the optical waveguide layer 64.

Figure 7:
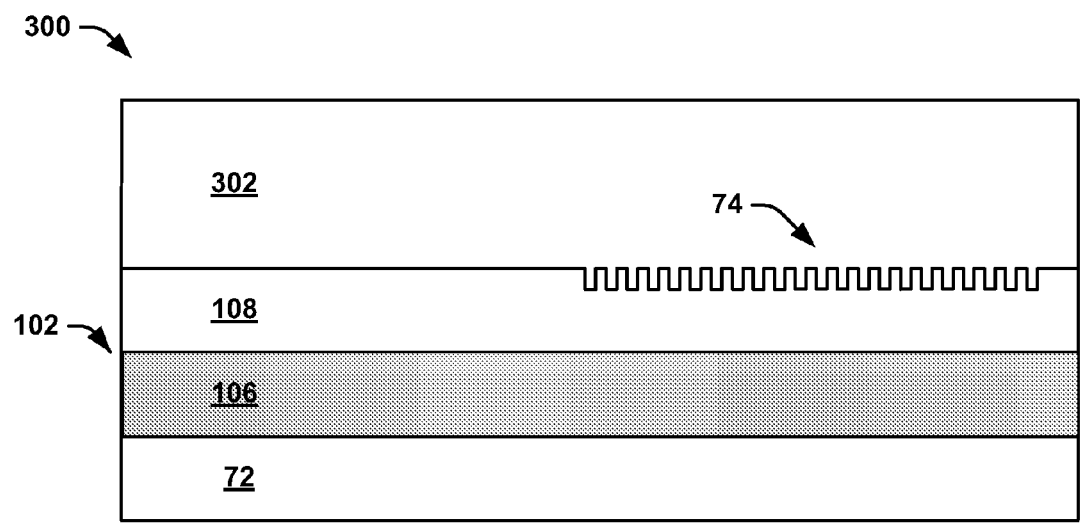
FIG. 7 illustrates an example diagram of a cross-sectional view of the SOI structure of FIG. 6 with a cover layer.

FIG. 7 illustrates an example diagram 300 of a cross-sectional view of the SOI structure 102 of FIG. 6 with a cover material 302. The cover material 302 can be SiN, as described previously, that has been deposited onto the etched second silicon layer 108 at an appropriate thickness in any of a variety of ways. Therefore, the cover material 302 can correspond to the cover layer 66. The cover material 302 can be deposited in such a manner as to fill in the gaps of the grating 74 with the cover material 302, such that the cover material 302 mates with the second silicon layer 108. Alternatively, the cover material 302 can overlay the grating 74, such that the gaps in the grating 74 can be hollow.

Figure 8:
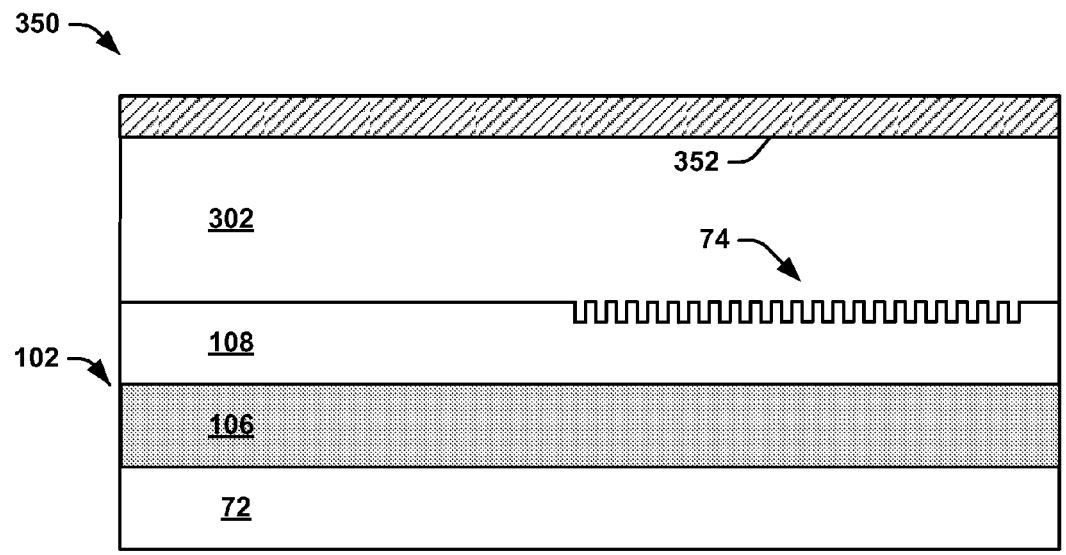
FIG. 8 illustrates an example diagram of a cross-sectional view of the structure of FIG. 7 with a photoresist layer.

FIG. 8 illustrates an example diagram 350 of a cross-sectional view of the SOI structure 102 of FIG. 7 with a photoresist layer 352. The SOI structure 152 is illustrated as including the photoresist layer 352 formed on the cover material 302. The photoresist layer 352 can have a thickness suitable for fabricating the optical coupling system 54 (e.g., about 500 Å-5000 Å), such as based on the wavelength of radiation used to pattern the photoresist layer 352. The photoresist layer 352 may be formed overlying the cover material 302 via conventional spin-coating or spin casting deposition techniques.

Figure 9:
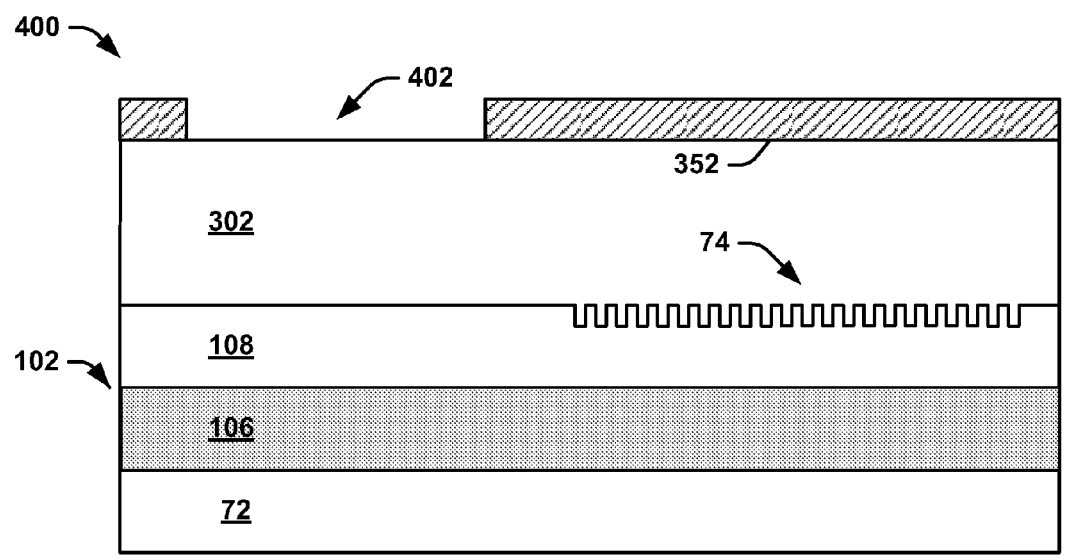
FIG. 9 illustrates an example diagram of the structure of FIG. 8 with the photoresist layer having been patterned.

FIG. 9 illustrates an example diagram 400 of the SOI structure 102 of FIG. 8 with the photoresist layer 352 having been patterned. Specifically, photoresist layer 352 is patterned using conventional techniques to form an opening 402. The patterned photoresist layer 352 can thus serve as an etch mask layer for processing or etching the underlying cover material 302 to form a recess, such as to receive the single mode optical fiber 52.

Figure 10:
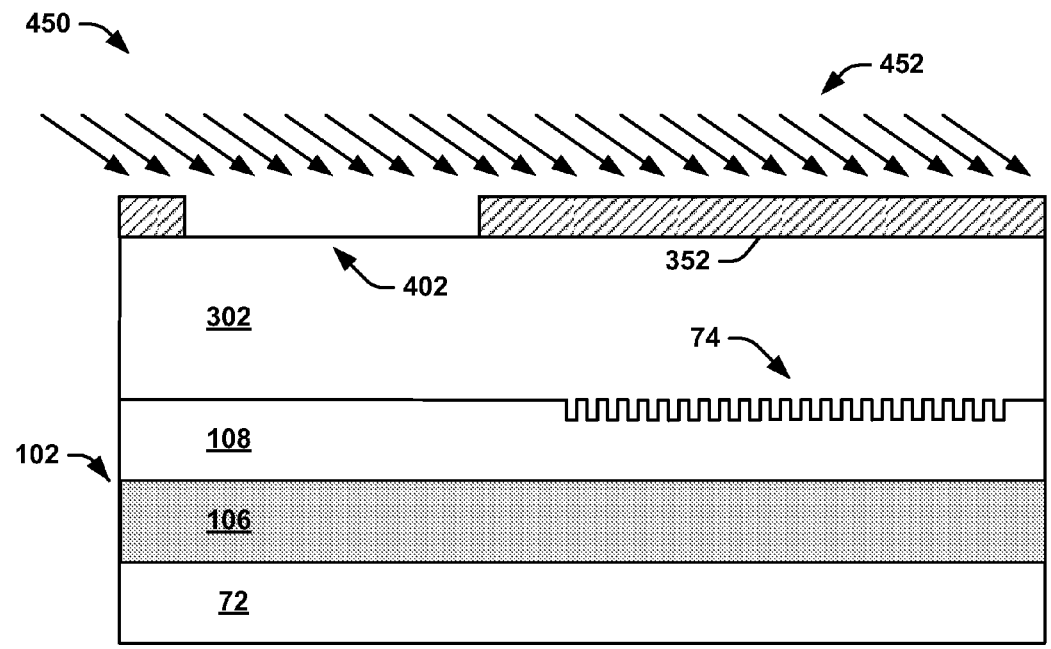
FIG. 10 illustrates an example diagram of the structure of FIG. 9 undergoing an etching step.

FIG. 10 illustrates an example diagram 450 of the SOI structure 102 of FIG. 9 undergoing an etching step. The etch can be an anisotropic DRIE etch, as indicated by the arrows 452. In the example of FIG. 10, the arrows 452 indicate that the etch can be performed at an angle associated with the recess, such as corresponding to the coupling angle $\theta_1$. Any suitable DRIE etch technique may be used to etch the cover material 302. For example, the cover material 302 can be anisotropically etched with one or more plasma gases, such as carbon tetrafluoride ($CF_4$) containing fluorine ions, in a commercially available etcher, such as a parallel plate DRIE apparatus or, alternatively, an electron cyclotron resonance (ECR) plasma reactor to replicate the mask pattern of the opening 402 to a desired depth and dimension of the recess. However, it is to be understood that other etching techniques can be implemented in the etching step described in the example of FIG. 10.

Figure 11:
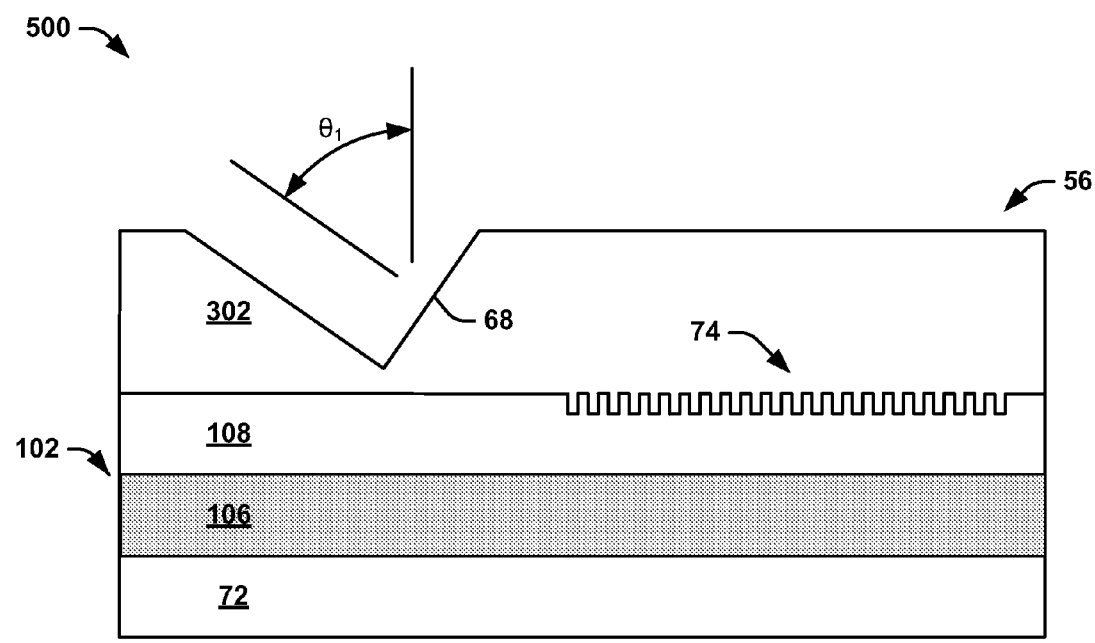
FIG. 11 illustrates an example diagram of the structure of FIG. 10 after the etching step is substantially complete.

FIG. 11 illustrates an example diagram 500 of the SOI structure 102 of FIG. 10 after the etching step is substantially complete. Specifically, the diagram 500 illustrates a view of the complete optical coupling system 54 after a stripping step is substantially complete to remove remaining portions of the photoresist layer 402. Therefore, the SOI structure 102 includes the recess 68 that has been etched via the DRIE etch process of the example of FIG. 10 in the cover material 302 corresponding to the cover layer 66. In the example of FIG. 11, the recess 68 is demonstrated as having been etched in a manner that the coupling angle $\theta_1$ of the optical signal 60 provided to and/or from the single mode optical fiber 52 is greater than the TIR angle $\theta_1$ associated with the cover material 302 and the insulator layer 106, corresponding to the cover layer 66 and the substrate layer 62, respectively, as provided previously in Equation 2.

Figure 12:
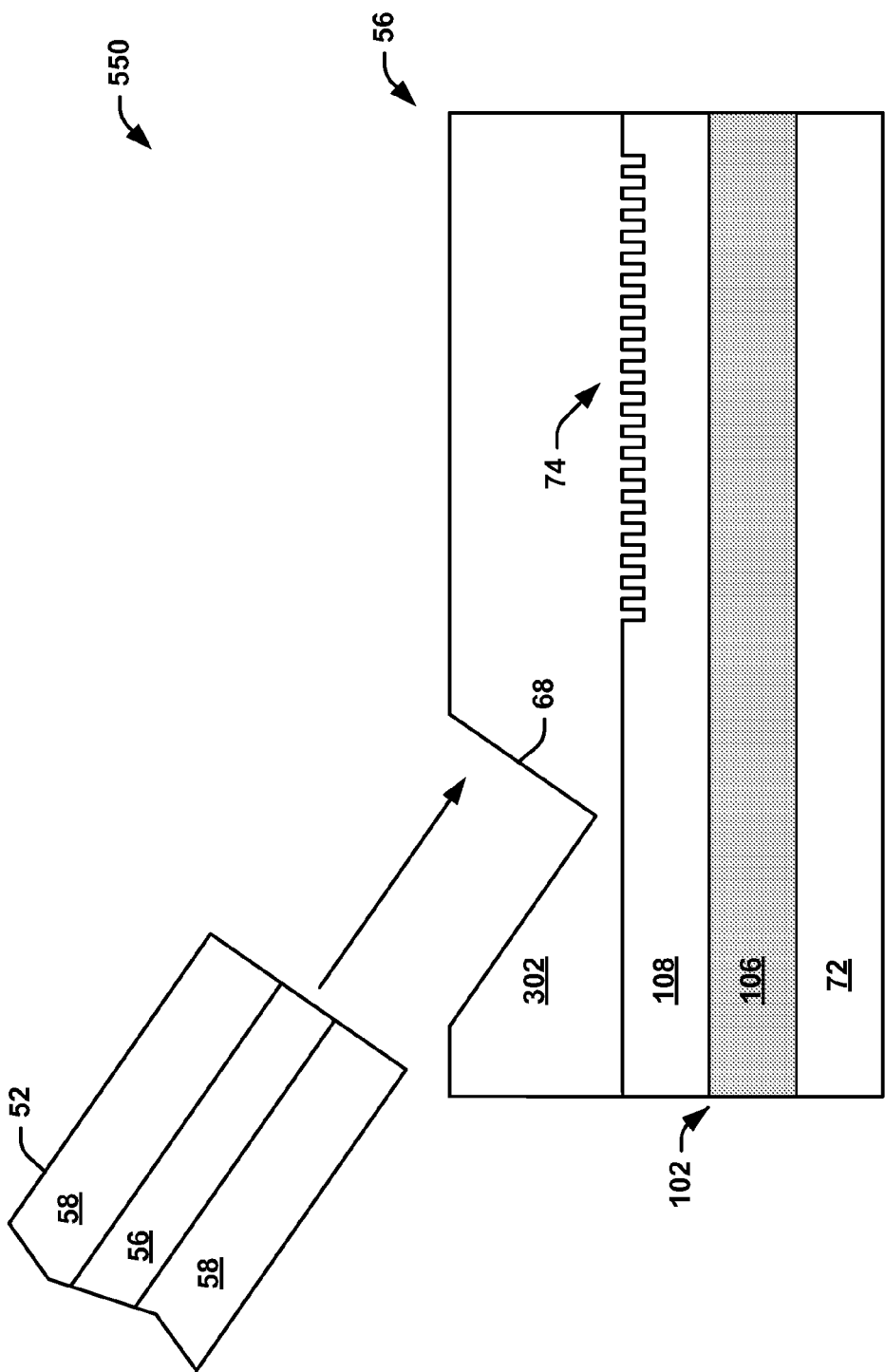
FIG. 12 illustrates an example diagram of a cross-sectional view of the optical coupling system of FIG. 11 being coupled with an optical fiber.

FIG. 12 illustrates an example diagram 550 of a cross-sectional view of the optical coupling system 56 of FIG. 11 being coupled with the single mode optical fiber 52. The single mode optical fiber 52 comprises the single mode core 56 and the cladding 58. The single mode optical fiber 52 is received into the recess 68 at the coupling angle $\theta_1$. As an example, the single mode optical fiber 52 can be spliced or otherwise bonded to the cover material 302. Alternatively, the single mode optical fiber 52 can be suspended above the cover material 302, such that the optical signal 60 propagates through free space between the single mode optical fiber 52 and the cover layer 66. Accordingly, upon physically or optically coupling the single mode optical fiber 52 to the optical coupling system 56, the diagram 550 corresponds to the diagram 50 in the example of FIG. 2.

Figure 13:
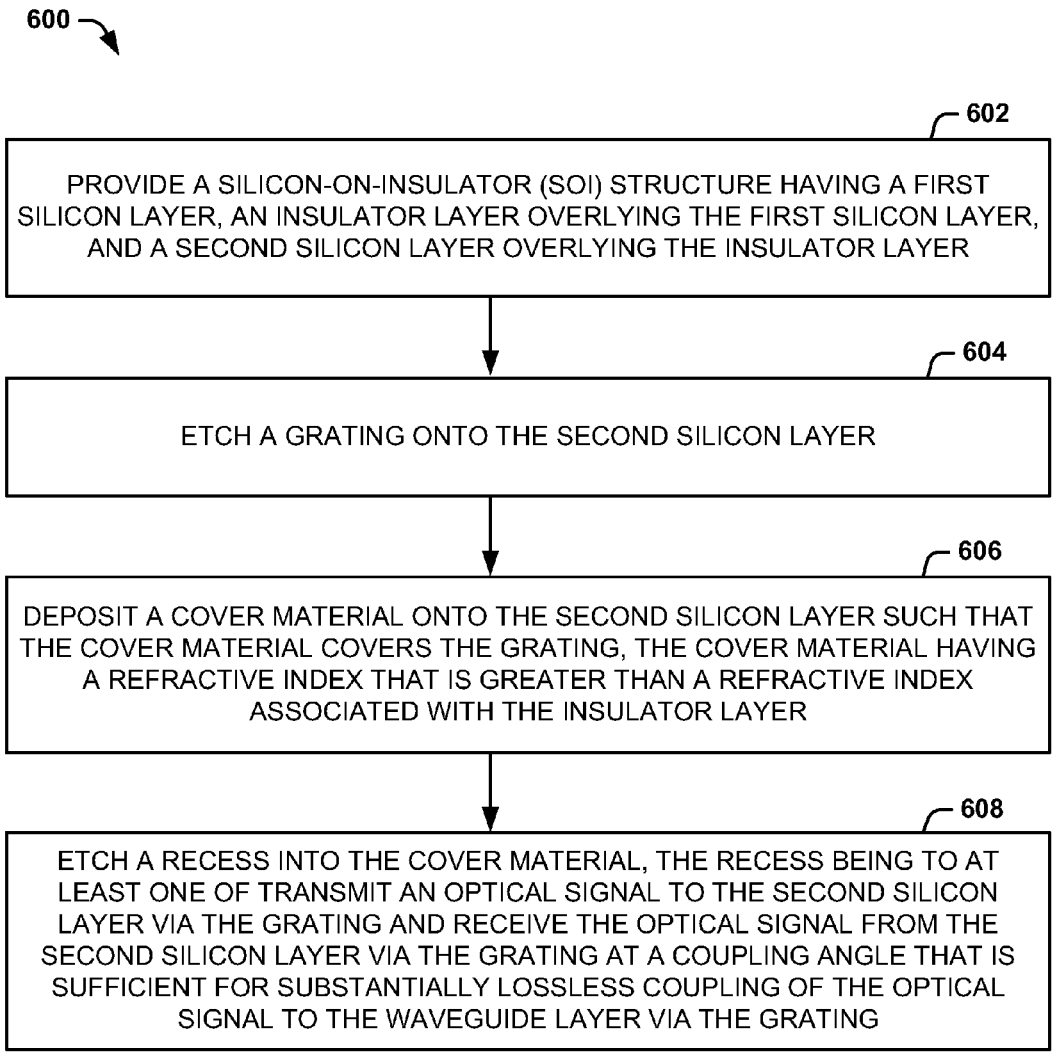
FIG. 13 illustrates an example of a method for fabricating an optical coupling system.

In view of the foregoing structural and functional features described above, an example method will be better appreciated with reference to FIG. 13. While, for purposes of simplicity of explanation, the method of FIG. 13 is shown and described as executing serially, it is to be understood and appreciated that the method is not limited by the illustrated order, as parts of the method could occur in different orders and/or concurrently from that shown and described herein.

FIG. 16 illustrates an example of a method 600 for fabricating an optical coupling system. At 602, an SOI structure (e.g., the SOI structure 102) having a first silicon layer (e.g., the first silicon layer 72), an insulator layer (e.g., the insulator layer 106) overlying the first silicon layer, and a second silicon layer (e.g., the second silicon layer 108) overlying the insulator layer is provided. At 604, a grating (e.g., the grating 74) is etched onto the second silicon layer. At 606, a cover material (e.g., the cover material 302) is deposited onto the second silicon layer such that the cover material covers the grating, the cover material having a refractive index (e.g., the refractive index $n_1$) that is greater than a refractive index (e.g., the refractive index $n_2$) associated with the insulator layer. At 608, a recess (e.g., the recess 68) is etched into the cover material, the recess being to at least one of transmit an optical signal (e.g., the optical signal 60) to the second silicon layer via the grating and receive the optical signal from the second silicon layer via the grating at a coupling angle (e.g., the coupling angle $\theta_1$) that is sufficient for substantially lossless coupling of the optical signal to the waveguide layer via the grating.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to

What is claimed is:

1. An optical coupling system comprising:
   a substrate layer;
   an optical waveguide material overlying the substrate layer, the optical waveguide material having a grating; and
   a cover material overlying the optical waveguide material to couple an optical signal to the optical waveguide material via the grating at a coupling angle, wherein:
   the optical signal is one of: (1) provided or (2) received at a coupling angle that is greater than a total internal reflection (TIR) angle associated with the substrate layer and the wavequide layer and a TIR angle associated with the cover material and the waveguide layer; and
   approximately zero energy of the coupled optical signal is lost in the substrate layer due to a combination of the coupling angle and a difference in refractive indices between the cover material and the substrate layer.

2. The system of claim 1, wherein the substrate layer has a first refractive index and the cover material has a second refractive index that is greater than the first refractive index.

3. The system of claim 1, wherein the substrate layer and the optical waveguide material are formed from a silicon-on-insulator (SOI) structure comprising a first silicon layer, an insulator layer overlying the first silicon layer, and a second silicon layer overlying the insulator layer, such that the insulator layer corresponds to the substrate layer and the second silicon layer corresponds to the optical waveguide material.

4. The system of claim 1, wherein the cover material comprises a recess etched into the cover material that is to receive an optical fiber, the optical fiber being to at least one of provide the optical signal to the optical waveguide layer via the grating and receive the optical signal from the optical waveguide material via the grating.

5. The system of claim 4, herein the optical fiber is a single mode fiber.

6. An optical system comprising:
   the optical coupling system of claim 1;
   an optical transmission element; and
   an optical waveguide coupled to the optical waveguide material.

7. A method for fabricating an optical coupling system the method comprising:
   providing a silicon-on-insulator (SOI) structure having a first silicon layer, an insulator layer overlying the first silicon layer, and a second silicon layer overlying the insulator layer;
   etching a grating onto the second silicon layer;
   depositing a cover material onto the second silicon layer such that the cover material covers the grating, the cover material having a refractive index that is greater than a refractive index associated with the insulator layer; and
   etching a recess into the cover material, the recess being to at least one of (1) transmit an optical signal to the second silicon layer via the grating or (2) receive the optical signal from the second silicon layer via the grating, wherein the optical signal is transmitted or received at a coupling angle that is greater than a total internal reflection (TIR) angle associated with the insulator and the second silicon layer and a TIR angle associated with the cover material and the second silicon layer.

8. The method of claim 7, wherein providing the SOI structure comprises providing the second silicon layer as being substantially tapered in width from the grating for coupling to an optical waveguide.

9. The method of claim 7, wherein etching the recess comprises etching the recess into the cover material to receive the optical fiber from a laser.

10. The method of claim 7, wherein etching the recess comprises etching the recess into the cover material to receive a single mode optical fiber.

11. An optical coupling system comprising:
    a substrate layer having a first refractive index;
    an optical waveguide material overlying the substrate layer and comprising a grating; and
    a cover material overlying the optical waveguide material to couple an optical signal to the optical waveguide layer via the grating at a coupling angle that is greater than a total internal reflection (TIR) angle associated with the substrate layer and optical waveguide material and a TIR angle associated with the cover material and the optical waveguide material, the cover material having a second refractive index that is greater than the first refractive index.

12. The system of claim 11, wherein the substrate layer and the optical waveguide material are formed from a silicon-on-insulator (SOI) structure comprising a first silicon layer, an insulator layer overlying the first silicon layer, and a second silicon layer overlying the insulator layer, such that the insulator layer corresponds to the substrate layer and the second silicon layer corresponds to the optical waveguide material.

13. An optical system comprising the optical coupling system of claim 11, the optical system further comprising an optical transmission element and an optical waveguide coupled to the optical waveguide material.

* * * * *